US012545163B2

(12) United States Patent
Myochin et al.

(10) Patent No.: US 12,545,163 B2
(45) Date of Patent: Feb. 10, 2026

(54) HEADREST HOLDER AND FIXING STRUCTURE THEREFOR (71) Applicant: TACHI-S CO., LTD., Ome (JP)

(72) Inventors: Keita Myochin, Ome (JP); Takashi Yokoyama, Ome (JP); Atsushi Koike, Ome (JP); Shogo Suzuki, Ome (JP)

(73) Assignee: TACHI-S CO., LTD., Tokyo (JP)

( * ) Notice: Subject to any disclaimer, the term of this patent is extended or adjusted under 35 U.S.C. 154(b) by 174 days.

(21) Appl. No.: 18/645,530

(22) Filed: Apr. 25, 2024

(65) Prior Publication Data

US 2024/0359608 A1 Oct. 31, 2024

(30) Foreign Application Priority Data

Apr. 28, 2023 (JP) .................. 2023-074134

(51) Int. Cl.
B60N 2/812 (2018.01)
(52) U.S. Cl.
CPC .................... B60N 2/812 (2018.02)
(58) Field of Classification Search
CPC .......... B60N 2/80; B60N 2/806; B60N 2/809; B60N 2/812; B60N 2/815; B60N 2/818
See application file for complete search history.

(56) References Cited

U.S. PATENT DOCUMENTS

| 2015/0091356 A1* | 4/2015 | Ozaki | B60N 2/803 297/391 |
| 2015/0145309 A1* | 5/2015 | Takahashi | B60N 2/809 297/404 |

FOREIGN PATENT DOCUMENTS

| JP | H11-198703 A | 7/1999 |
| JP | 2000-245566 A | 9/2000 |
| JP | 2009-112524 A | 5/2009 |
| JP | 2014-008335 A | 1/2014 |
| JP | 2015-091687 A | 5/2015 |
| JP | 2019-093828 A | 6/2019 |

OTHER PUBLICATIONS

Office Action dated Aug. 22, 2024, issued in counterpart JP Application No. 2023-074134 with English translation. (11 pages).

* cited by examiner

Primary Examiner — Tye William Abell
(74) Attorney, Agent, or Firm — WHDA, LLP (57) ABSTRACT A plurality of pressing portions 38 protrude inward in a radial direction from an inner peripheral surface of a tubular main body portion 35 (part of a tube body) and are each fixed at both ends thereof in an up-down direction to the main body portion 35. Since the plurality of pressing portions 38 are aligned in the up-down direction, a stay 22 or 23 can be inhibited from oscillating with a contact portion between one pressing portion 38 and the stay 22 or 23 as a fulcrum. As a result, rattling of the stay 22 or 23 relative to a headrest holder 30 or 31 can be suppressed.

8 Claims, 6 Drawing Sheets

HEADREST HOLDER AND FIXING STRUCTURE THEREFOR

TECHNICAL FIELD

The present invention relates to a headrest holder and a fixing structure therefor, and in particular, relates to a headrest holder and a fixing structure therefor that can suppress rattling of a stay.

BACKGROUND ART

A tubular headrest holder into which a stay of a headrest is inserted is attached to an upper frame of a backrest portion of a passenger seat. As an attaching method therefor, Japanese Patent Application Laid-Open (kokai) No. 2009-112524 describes a method in which a headrest holder is inserted into a quadrangular tubular bracket fixed to an upper frame.

Furthermore, in Japanese Patent Application Laid-Open (kokai) No. 2009-112524, a pressing portion formed in the headrest holder is pressed against a stay, and outward deformation of the pressing portion is restricted by the inner peripheral surface of the bracket, thereby ensuring a pressing force by the pressing portion and suppressing rattling between the headrest holder and the stay.

SUMMARY

However, when there is no component to restrict outward deformation of the pressing portion, for example, when the headrest holder of Japanese Patent Application Laid-Open (kokai) No. 2009-112524 is directly attached to the upper frame without a bracket as in Japanese Patent Application Laid-Open (kokai) No. 2000-245566, a problem arises that it is difficult to ensure the pressing force by the pressing portion. In addition, even when a bracket is used, if the bracket is configured such that outward deformation of the pressing portion is not restricted, the same problem arises.

The shape of the pressing portion of Japanese Patent Application Laid-Open (kokai) No. 2009-112524 is designed on the assumption that the pressing portion is brought into contact with the inner peripheral surface of the bracket. Thus, even if the rigidity of the pressing portion is adjusted, it is difficult to sufficiently suppress rattling between the headrest holder and the stay.

The present invention has been made in order to solve the above-described problems, and an object of the present invention is to provide a headrest holder and a fixing structure therefor that can suppress rattling of a stay.

In order to attain this object, a headrest holder of the present invention is to be attached to an upper frame of a back frame of a passenger seat and includes: a tube body into which a stay of a headrest capable of supporting a head of a seated person from back is inserted from an upper end thereof; and a plurality of pressing portions protruding inward in a radial direction from an inner peripheral surface of the tube body so as to be pressed against the stay, and formed so as to be aligned in an up-down direction. Each of the pressing portions is fixed at both ends thereof in the up-down direction to the tube body.

In the headrest holder according to the first aspect, each of the plurality of pressing portions projecting inward in the radial direction from the inner peripheral surface of the tube body is fixed at both ends thereof in the up-down direction to the tube body. Therefore, even if there is no component to restrict outward deformation of each pressing portion, it is easy to ensure a pressing force applied when the pressing portion is pressed against the stay. Furthermore, since the plurality of pressing portions are aligned in the up-down direction, the stay can be inhibited from oscillating with a contact portion between one pressing portion and the stay as a fulcrum. As a result, rattling of the stay relative to the headrest holder can be suppressed.

With a headrest holder according to a second aspect, the following effects are achieved in addition to the effects achieved by the headrest holder according to the first aspect. Each of the pressing portions includes a pair of inclined portions inclined inward in the radial direction while extending from both ends in the up-down direction toward each other, and a contact portion connecting the pair of inclined portions in the up-down direction and capable of coming into surface contact with the stay. By the contact portion coming into surface contact with the stay, a pressing force from each pressing portion to the stay and a frictional force therebetween can be ensured, for example, even when each pressing portion is formed from a relatively easily deformable resin (e.g., polypropylene).

With a headrest holder according to a third aspect, the following effects are achieved in addition to the effects achieved by the headrest holder according to the first aspect. The tube body includes a tubular upper end portion forming an upper end side of the tube body, and a tubular main body portion extending downward from the upper end portion. A projection portion protrudes inward in the radial direction from a front side of an inner peripheral surface of the upper end portion. By the projection portion being pressed against the stay, rattling of the stay at a position close to the headrest can be suppressed.

Furthermore, the projection portion is provided on the front side (seated person side) of the upper end portion, and the pressing portions protrude inward in the radial direction from the back side of the inner peripheral surface of the main body portion. Owing to these, a load can be applied from the projection portion and the pressing portions to the stay such that the headrest is tilted backward. As a result, the headrest can be inhibited from rattling so as to be tilted backward when a seated person places their head against the headrest.

A headrest holder according to a fourth aspect is the headrest holder according to the third aspect, wherein the headrest holder has a locking mechanism for fixing a vertical position of the stay by engaging a groove provided on an outer peripheral surface of the stay, or does not have the locking mechanism. The projection portion is provided separately from the locking mechanism when the headrest holder has the locking mechanism.

With a headrest holder according to a fifth aspect, the following effects are achieved in addition to the effects achieved by the headrest holder according to the first aspect. A pair of projection portions protrude inward in the radial direction from the inner peripheral surface of the tube body. The pair of projection portions are arranged symmetrically in a circumferential direction at positions opposing the pressing portions when viewed in an axis direction of the tube body. By the projection portions and the pressing portions being pressed against the stay, both rattling of the stay in a direction in which each projection portion and each pressing portion oppose each other and rattling of the stay in a direction orthogonal thereto can be suppressed.

With a headrest holder according to a sixth aspect, the following effects are achieved in addition to the effects achieved by the headrest holder according to the first aspect. A cut portion is formed on one side in a circumferential direction of the plurality of pressing portions in the tube body from the one side to positions opposing the pressing portion, over the circumferential direction, so as to be continuous in the up-down direction. Here, for example, when the headrest holder made of a resin is molded using a mold, since the pressing portions which protrude from the inner peripheral surface of the tube body are aligned in the up-down direction, if an attempt is made to pull out, in the axis direction, a part of the mold that molds this inner peripheral surface, the part of the mold is forcibly pulled out. However, with this configuration, a part of the mold that molds a portion between the pressing portions aligned in the up-down direction is allowed to be pulled out in the radial direction from the cut portion, thereby easily avoiding forcibly pulling out of the mold.

With a headrest holder according to a seventh aspect, the following effects are achieved in addition to the effects achieved by the headrest holder according to the first aspect. The upper frame includes an upper surface portion and a lower surface portion spaced apart from each other in the up-down direction. An upper fitting portion of the headrest holder is fitted into a hole provided in the upper surface portion, and a lower fitting portion of the headrest holder is fitted into a hole provided in the lower surface portion. The pressing portions are formed at positions away from the upper fitting portion and the lower fitting portion in the up-down direction. Accordingly, outward deformation of each pressing portion pressed against the stay is less likely to be restricted by the upper frame, so that the pressing force by the pressing portion can be inhibited from fluctuating due to such restriction.

With a headrest holder according to an eighth aspect, the following effects are achieved in addition to the effects achieved by the headrest holder according to the seventh aspect. When the headrest holder is fitted to the upper frame at the upper fitting portion and the lower fitting portion thereof, and when a backward load is applied from the head of a seated person to the headrest, the load is likely to be concentrated on each of the back side of the outer peripheral surface of the upper fitting portion and the front side of the outer peripheral surface of the lower fitting portion. An upper thick projection portion and a lower thick projection portion having a larger width in the circumferential direction protrude from the positions where this load is likely to be concentrated, so that buckling or the like of the upper fitting portion and the lower fitting portion due to this load can be suppressed.

An upper narrow projection portion and a lower narrow projection portion having a smaller width in the circumferential direction protrude from the front side of the outer peripheral surface of the upper fitting portion and the back side of the outer peripheral surface of the lower fitting portion which are opposite to these sides. Accordingly, it can be made easier to fit the upper fitting portion and the lower fitting portion into the holes of the upper frame, and rattling therebetween can also be suppressed.

A headrest holder fixing structure according to a ninth aspect includes the headrest holder according to the seventh aspect and an upper frame to which the headrest holder is attached. The upper frame includes an upper surface portion having a hole into which the upper fitting portion of the headrest holder is fitted, and a lower surface portion placed below the upper surface portion so as to be spaced apart from the upper surface portion and having a hole into which the lower fitting portion of the headrest holder is fitted. The pressing portions are located away from the upper frame, so that outward deformation of each pressing portion is less likely to be restricted by the upper frame. Therefore, with this headrest holder fixing structure, the same effects as those achieved by the headrest holder according to the seventh aspect are achieved.

DETAILED DESCRIPTION

Figure 1:
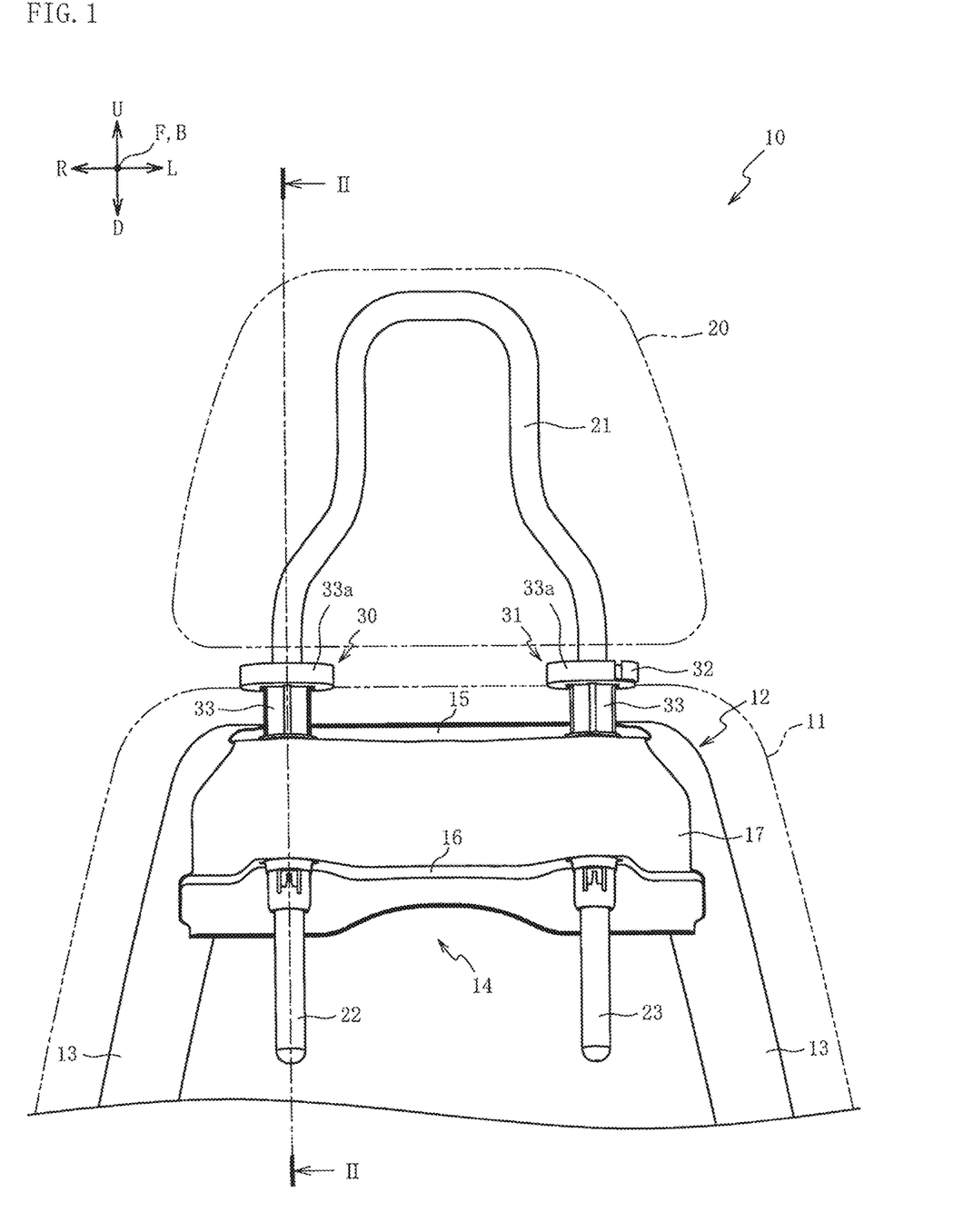
FIG. 1 Front view of headrest holders and an upper frame of one embodiment.

Hereinafter, a preferred embodiment of the present invention will be described with reference to the accompanying drawings. FIG. 1 is a front view of headrest holders (hereinafter referred to as "holders") 30 and 31 and an upper frame 14 according to one embodiment. The holders 30 and 31 and the upper frame 14 are parts of a passenger seat 10 installed in a transportation means such as an automobile, a railroad vehicle, a ship, and an aircraft.

The passenger seat 10 includes a seat cushion (not shown) forming a seat surface, a seat back 11 forming a backrest, and a headrest 20 supporting the head of a seated person from the back. Hereinafter in the present specification, a description will be given with the up-down direction, the left-right direction, and the front-back direction, as viewed from a person seated on the passenger seat 10, being defined as the up-down direction (arrow U-D direction), the left-right direction (arrow L-R direction), and the front-back direction (arrow F-B direction) of each part (holders 30 and 31, etc.) of the passenger seat 10.

The seat back 11 is formed by supporting a cushion material, composed of foam such as soft polyurethane foam, by a back frame 12 and covering the cushion material with a skin material. In FIG. 1, the outer shape (skin material) of the seat back 11 is shown by an alternate long and two short dashes line.

The back frame 12 includes a pair of left and right side frames 13 extending in the up-down direction, and the upper frame 14 connecting upper portions of the pair of side frames 13 and extending in the left-right direction. The two holders 30 and 31 are attached to the upper frame 14 so as to be spaced apart from each other in the left-right direction, and the headrest 20 is attached to the holders 30 and 31.

The headrest 20 is formed by supporting a cushion material, composed of foam such as soft polyurethane foam, by an internal frame 21 and covering the cushion material with a skin material. In FIG. 1, the outer shape (skin material) of the headrest 20 is shown by an alternate long and two short dashes line as in the seat back 11.

The internal frame 21 is formed by bending a metal pipe into a substantially U-shape which is inverted vertically in a view in the front-back direction. A pair of left and right stays 22 and 23 are provided so as to extend downward from the lower ends of the internal frame 21. The pair of stays 22 and 23 are portions exposed downward from the headrest 20, and are placed parallel so as to be spaced apart from each other in the left-right direction. The stays 22 and 23 are inserted into the holders 30 and 31.

The holder 31 on the left side (right side of the drawing sheet of FIG. 1) is different from the holder 30 on the right side (left side of the drawing sheet of FIG. 1) having no locking mechanism 32, mainly in that the holder 31 has a locking mechanism 32 for fixing the vertical position of the stay 23, and the holder 31 is configured in substantially the same manner as the holder 30 for the other. Hereinafter, the holder 30 will be basically described, and part of the description of the holder 31 is omitted.

The locking mechanism 32 is a known mechanism for fixing the position in the up-down direction of the stay 23 relative to the holder 31. The locking mechanism 32 is provided at a flange 33a of an upper end portion 33 of the holder 31. The locking mechanism 32 fixes the stay 23 to the holder 31 by engaging any one of a plurality of grooves aligned in the up-down direction on the outer peripheral surface of the stay 23. By a seated person or the like pushing the locking mechanism 32, which is exposed on the left side of the flange 33a of the holder 31, to the right side, the locking mechanism 32 is disengaged from the groove of the stay 23 to release the fixation. This release allows the stay 23 to move in the up-down direction relative to the holder 31.

The stay 23 is formed sufficiently long relative to the holders 30 and 31 such that even when the locking mechanisms 32 are engaged with the lowermost grooves of the stays 22 and 23, the stays 22 and 23 protrude from the lower ends of the holders 30 and 31. Accordingly, it can be made easier to distribute and receive loads in the front-back direction, which are applied from the stays 22 and 23 of the headrest 20 to the holders 30 and 31, over the entire holders 30 and 31.

Figure 2:
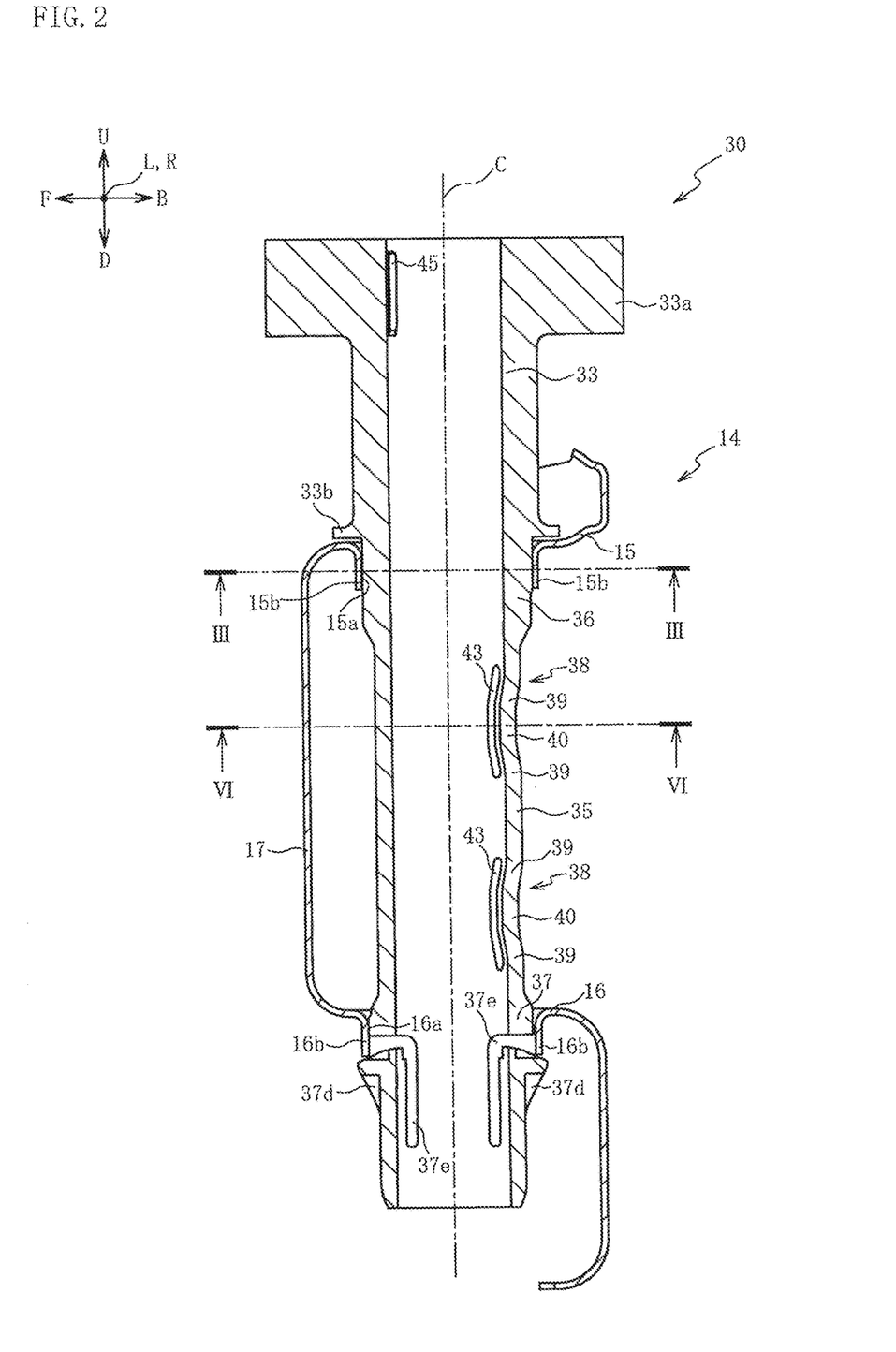
FIG. 2 Cross-sectional view of the headrest holder and the upper frame taken along a line II-II in FIG. 1.
Figure 3:
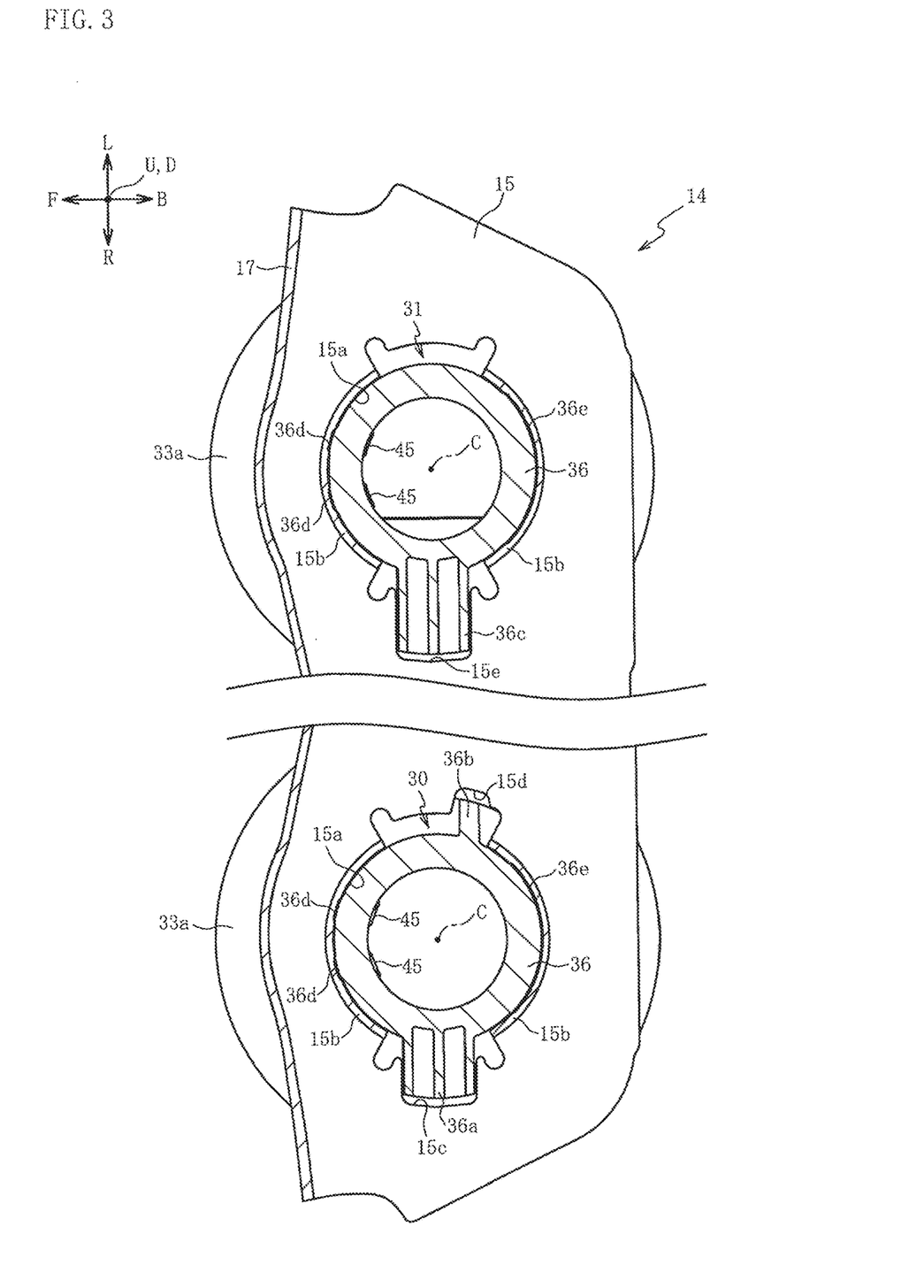
FIG. 3 Cross-sectional view of the headrest holders and the upper frame taken along a line III-III in FIG. 2.
Figure 4:
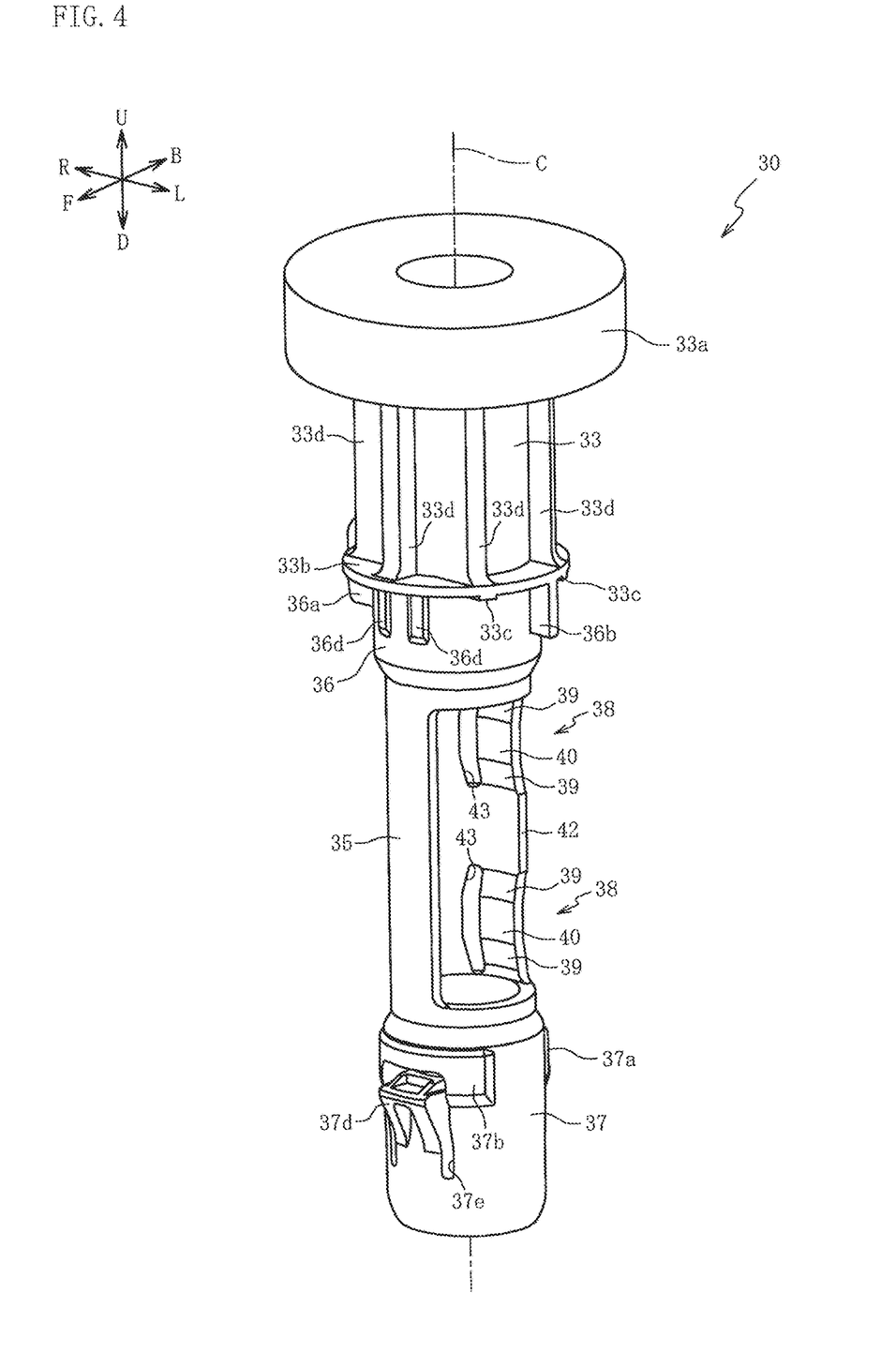
FIG. 4 Perspective view of the headrest holder as viewed from the upper front side.
Figure 5:
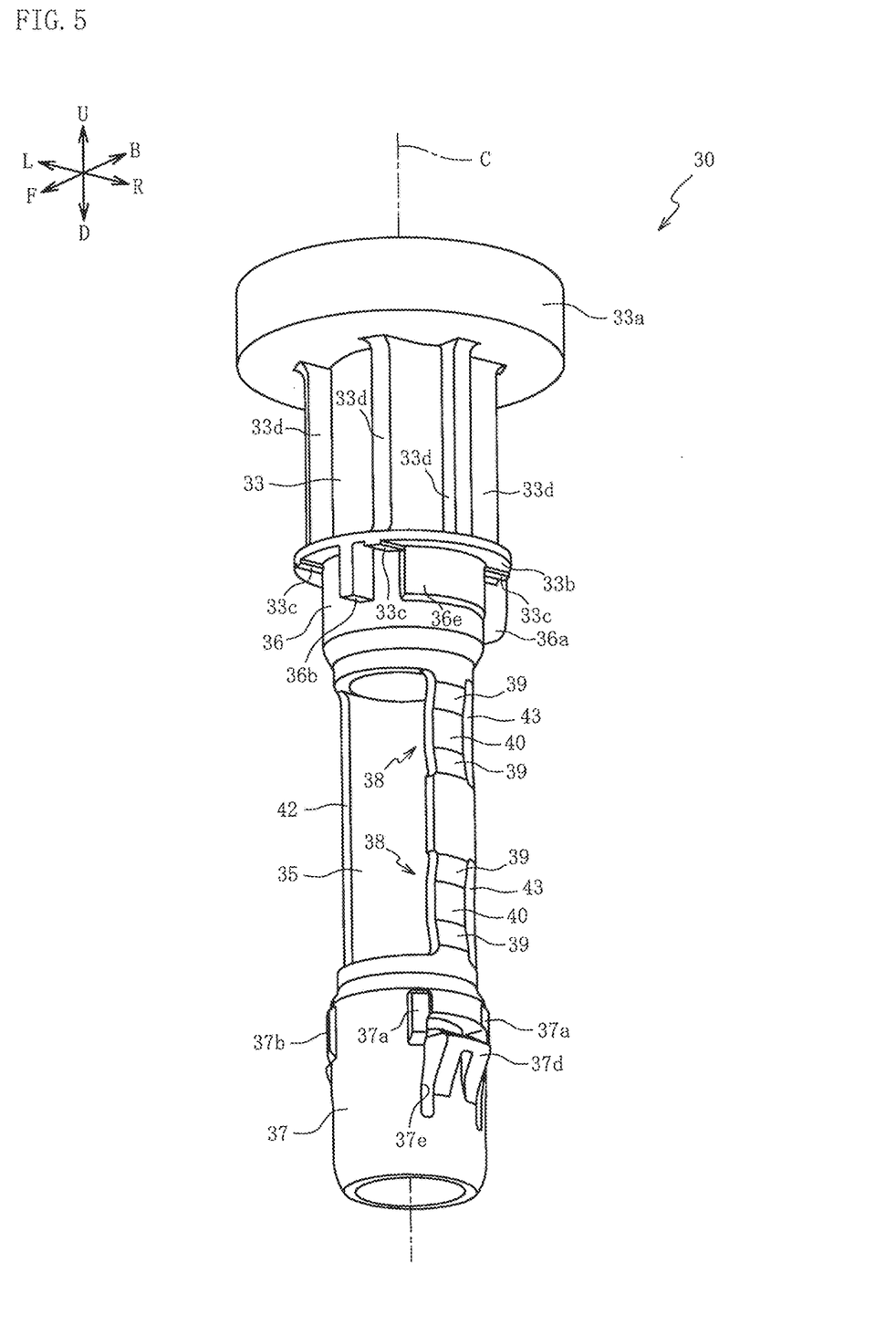
FIG. 5 Perspective view of the headrest holder as viewed from the lower back side.
Figure 6:
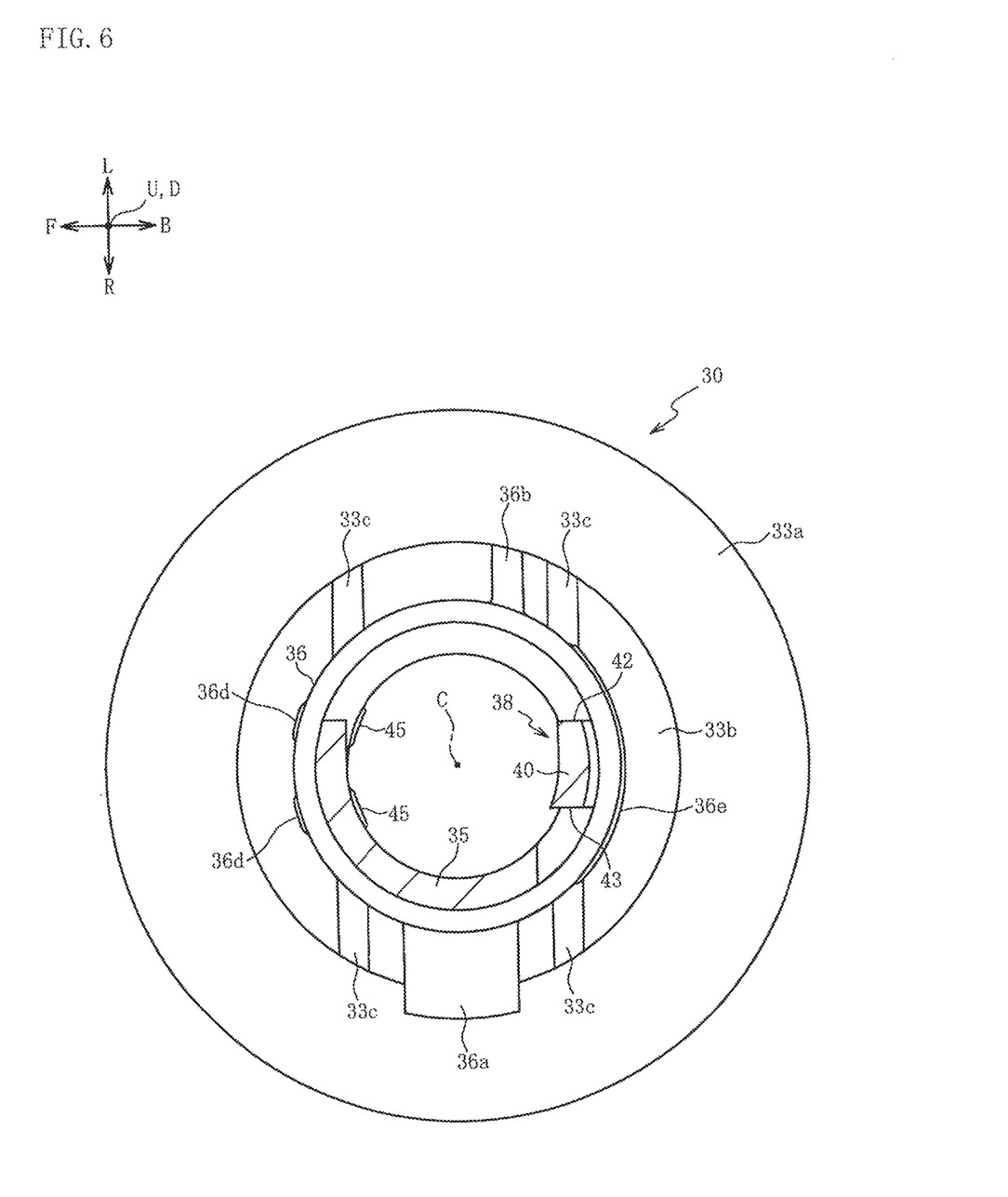
FIG. 6 Cross-sectional view of the headrest holder taken along a line VI-VI in FIG. 2.

Next, the holders 30 and 31 and the upper frame 14 (hereinafter referred to as "frame 14") will be described in further detail with reference to FIG. 2 to FIG. 6 in addition to FIG. 1. FIG. 2 is a cross-sectional view of the holder 30 and the frame 14 taken along a line II-II in FIG. 1. FIG. 3 is a cross-sectional view of the holders 30 and 31 and the frame 14 taken along a line III-III in FIG. 2. FIG. 4 is a perspective view of the holder 30 as viewed from the upper front side. FIG. 5 is a perspective view of the holder 30 as viewed from the lower back side. FIG. 6 is a cross-sectional view of the holder 30 taken along a line VI-VI in FIG. 2.

In FIG. 2 to FIG. 6, axis C directions of the holders 30 and 31 are caused to coincide with the up-down direction (arrow U-D direction), but the axis C directions may be inclined with respect to the up-down direction. In addition, in FIG. 3, a portion of the frame 14 in the vicinity of the holders 30 and 31 is shown, and the other portion of the frame 14 is not shown.

As shown in FIG. 2, the frame 14 is a member formed by bending a metal plate, and mainly includes an upper surface portion 15, a lower surface portion 16, and a connecting surface portion 17. The upper surface portion 15 and the lower surface portion 16 are formed substantially parallel to each other. The lower surface portion 16 is placed below the upper surface portion 15 so as to be spaced apart from the upper surface portion 15. The connecting surface portion 17 is a portion connecting the front edges of the upper surface portion 15 and the lower surface portion 16 vertically over the left-right direction, and is placed substantially perpendicular to the upper surface portion 15 and the lower surface portion 16.

As shown in FIG. 2 and FIG. 3, a hole 15a is formed on each of both left and right sides of the upper surface portion 15 so as to penetrate in the up-down direction. Both front and back sides of each hole 15a are formed by the inner peripheral surface of a cylindrical wall 15b which is formed by bending downward the plate forming the upper surface portion 15. Accordingly, the hole 15a can be made longer in the up-down direction relative to the thickness of this plate. Axes C of the holes 15a (cylindrical walls 15b) on both left and right sides are arranged parallel to each other.

Both left and right sides of the hole 15a are not provided with the cylindrical wall 15b, and are recessed outward in the radial direction with respect to the inner peripheral surface of the cylindrical wall 15b. A recess 15c which is further recessed on the right side of the inner peripheral surface of the hole 15a and a recess 15d which is further recessed on the left side of the inner peripheral surface of the hole 15a are formed in the hole 15a on the right side. In addition, a recess 15e which is further recessed on the right side of the inner peripheral surface of the hole 15a is formed in the hole 15a on the left side. The recess 15c has the same dimension in the circumferential direction as the recess 15e, and has a smaller dimension in the radial direction than the recess 15e. The recess 15d has a smaller dimension in the circumferential direction than the recesses 15c and 15e.

A hole 16a is formed on each of both left and right sides of the lower surface portion 16 at a position opposing the hole 15a in the up-down direction, so as to penetrate in the up-down direction. The hole 16a is formed by the inner peripheral surface of a cylindrical wall 16b which is formed by bending downward the plate forming the lower surface portion 16. Accordingly, the hole 16a can be made longer in the up-down direction relative to the thickness of this plate. The hole 15a and the hole 16a (cylindrical wall 16b) at the positions opposing each other in the up-down direction share the same axis C.

The holder 30 is made of a synthetic resin such as polypropylene and is formed by a substantially cylindrical tube body that is open at both upper and lower ends thereof. The holder 30 is fitted into the holes 15a and 16a on the right side of the upper surface portion 15 and the lower surface portion 16. The stay 22 is inserted into the holder 30 through the opening at the upper end thereof. The inner diameter of the inner peripheral surface of the holder 30 is basically the same over the up-down direction, and is formed to be slightly larger than the stay 22. The holder 31 is fitted into the holes 15a and 16a on the left side, and the stay 23 is inserted into the holder 31 through the opening at the upper end thereof.

The holder 30 (tube body) is formed by the tubular upper end portion 33 including the upper end of the holder 30, and a tubular main body portion 35 extending downward from the upper end portion 33. The main body portion 35 forms a portion fitted into the hole 15a of the upper surface portion 15 to the lower end of the holder 30. The axes of the upper end portion 33 and the main body portion 35 coincide with the axis C of the holes 15a and 16a.

As shown in FIG. 2, FIG. 4, and FIG. 5, the upper end portion 33 includes the flange 33a provided at the upper end of the upper end portion 33 and protruding outward in the radial direction over the entire circumference of the upper end portion 33, a flange 33b provided at the lower end of the upper end portion 33 and protruding outward in the radial direction over the entire circumference of the upper end portion 33, and a plurality of (six in the present embodiment) reinforcement ribs 33d connecting the flanges 33a and 33b in the up-down direction. The flange 33a is a portion exposed upward from the skin material of the seat back 11 (see FIG. 1).

The flange 33b has a smaller thickness in the up-down direction and a smaller protruding amount in the radial direction than the flange 33a. A total of four linear ribs 33c extend in the left-right direction and protrude from both front and back sides and both left and right sides of the lower surface of the flange 33b, respectively. The linear ribs 33c partially thicken the flange 33b (by about 1 to 2 mm) and come into contact with the upper surface portion 15. Accordingly, the holder 30 can be made less likely to tilt frontward, backward, leftward, and rightward with respect to the upper surface portion 15, while ensuring the rigidity of the flange 33b.

The reinforcement ribs 33d connecting the flange 33a and the flange 33b are provided so as to protrude from a plurality of locations on the outer peripheral surface of the upper end portion 33 and be spaced apart from each other in the circumferential direction. Accordingly, the rigidity of the upper end portion 33 can be improved, and the strength of the upper end portion 33 against a load in the front-back direction transmitted from the stay 22 to the frame 14 can be ensured.

The main body portion 35 is a portion of the holder 30 that is attached to the frame 14. The main body portion 35 includes an upper fitting portion 36 to be fitted into the hole 15a and a lower fitting portion 37 to be fitted into the hole 16a. The outer peripheral surfaces of lower end portions of the upper fitting portion 36 and the lower fitting portion 37 are shaped to be tapered in order to facilitate insertion of the upper fitting portion 36 and the lower fitting portion 37 into the holes 15a and 16a from above.

As shown in FIG. 3, a protrusion 36a which is inserted into the recess 15c and a protrusion 36b which is inserted into the recess 15d protrude from the outer peripheral surface of the upper fitting portion 36 of the holder 30. A protrusion 36c which is inserted into the recess 15e protrudes from the outer peripheral surface of the upper fitting portion 36 of the holder 31. Accordingly, rotation of the holders 30 and 31 relative to the frame 14 can be suppressed, and the orientation of the holders 30 and 31 can be specified.

The protrusion 36c of the holder 31 is formed with a larger dimension in the radial direction relative to the protrusion 36a such that the protrusion 36c can be inserted into the recess 15e but cannot be inserted into the recess 15c. Accordingly, the holder 31 can be prevented from being mistakenly assembled into the hole 15a on the right side.

The recess 15d into which the protrusion 36b of the holder 30 is inserted is not provided in the hole 15a on the left side but is provided only in the hole 15a on the right side. Accordingly, the holder 30 can be prevented from being mistakenly assembled into the hole 15a on the left side.

As shown in FIG. 4 and FIG. 5, an upper narrow projection portion 36d protrudes from the front side of the outer peripheral surface of the upper fitting portion 36, and an upper thick projection portion 36e protrudes from the back side of the outer peripheral surface of the upper fitting portion 36. The protruding amounts of the upper narrow projection portion 36d and the upper thick projection portion 36e are each about 1 to 2 mm or less. The upper narrow projection portion 36d and the upper thick projection portion 36e are each a portion for partially thickening the upper fitting portion 36 so as to fill the gap between the hole 15a (cylindrical wall 15b) and the upper fitting portion 36. Accordingly, rattling in the front-back direction of the upper fitting portion 36 relative to the hole 15a can be suppressed.

The width of the upper narrow projection portion 36d in the circumferential direction is smaller than the length thereof in the up-down direction. Two upper narrow projection portions 36d are arranged symmetrically with respect to the center in the left-right direction of the upper fitting portion 36. The width of the upper thick projection portion 36e in the circumferential direction is larger than the length thereof in the up-down direction, and the upper thick projection portion 36e is formed laterally symmetrically. As a result of these, rattling in the left-right direction of the upper fitting portion 36 relative to the hole 15a can be suppressed.

A lower narrow projection portion 37a protrudes from the back side of the outer peripheral surface of the lower fitting portion 37, and a lower thick projection portion 37b protrudes from the front side of the outer peripheral surface of the lower fitting portion 37. The protruding amounts of the lower narrow projection portion 37a and the lower thick projection portion 37b are each about 1 to 2 mm or less. The lower narrow projection portion 37a and the lower thick projection portion 37b are each a portion for partially thickening the lower fitting portion 37 so as to fill the gap between the hole 16a (cylindrical wall 16b) and the lower fitting portion 37. Accordingly, rattling in the front-back direction of the lower fitting portion 37 relative to the hole 16a can be suppressed.

The width of the lower narrow projection portion 37a in the circumferential direction is smaller than the length thereof in the up-down direction. Two lower narrow projection portions 37a are arranged symmetrically with respect to the center in the left-right direction of the lower fitting portion 37. The width of the lower thick projection portion 37b in the circumferential direction is larger than the length thereof in the up-down direction, and the lower thick projection portion 37b is formed laterally symmetrically. As a result of these, rattling in the left-right direction of the lower fitting portion 37 relative to the hole 16a can be suppressed.

As described above, the holder 30 is attached to the frame 14 at two locations, that is, the upper fitting portion 36 and the lower fitting portion 37 which are spaced apart from each other in the up-down direction. Therefore, when a backward load is applied from the head of a seated person to the headrest 20 and this load is transmitted from the holder 30 to the frame 14, the load is likely to be concentrated on each of the back side of the outer peripheral surface of the upper fitting portion 36 and the front side of the outer peripheral surface of the lower fitting portion 37.

For example, if the upper narrow projection portions 36d and the lower narrow projection portions 37a having a smaller width are provided at the positions where the load is likely to be concentrated, it is likely that the upper narrow projection portions 36d (upper fitting portion 36) and the lower narrow projection portions 37a (lower fitting portion 37) will buckle.

In the present embodiment, since the upper thick projection portion 36e and the lower thick projection portion 37b having a larger width are respectively provided at the positions where the load is likely to be concentrated, the surface pressure applied from the frame 14 to each of the upper thick projection portion 36e and the lower thick projection portion 37b can be reduced. Therefore, buckling or the like of the upper thick projection portion 36e (upper fitting portion 36) and the lower thick projection portion 37b (lower fitting portion 37) due to the load can be suppressed.

In particular, it is preferable that the upper thick projection portion 36e and the lower thick projection portion 37b are each provided in a range of not less than 20 degrees from the center toward both sides in the left-right direction of the outer peripheral surface of the upper fitting portion 36 or the lower fitting portion 37. In this case, the surface pressure applied from the frame 14 to each of the upper thick projection portion 36e and the lower thick projection portion 37b can be smaller, and buckling or the like thereof can be further suppressed. In addition, the upper thick projection portion 36e and the lower thick projection portion 37b easily come into contact with both left and right sides of the inner peripheral surfaces of the holes 15a and 16a, so that rattling in the left-right direction of the holder 30 relative to the frame 14 can be further suppressed.

Furthermore, when a backward load is applied to the headrest 20, a larger load from the frame 14 is likely to be concentrated on the lower thick projection portion 37b than on the upper thick projection portion 36e due to the principle of leverage with the vicinity of the upper fitting portion 36 as a fulcrum. Since the width of the lower thick projection portion 37b is larger than the width of the upper thick projection portion 36e, the surface pressure applied from the frame 14 to the lower thick projection portion 37b can be smaller, and buckling or the like of the lower thick projection portion 37b can be suppressed.

Since the upper narrow projection portions 36d and the lower narrow projection portions 37a having a smaller width protrude from the front side of the upper fitting portion 36 and the back side of the lower fitting portion 37, respectively, it can be made easier to fit the upper fitting portion 36 and the lower fitting portion 37 into the holes 15a and 16a.

In addition, a claw 37d which is hooked on the lower end of the cylindrical wall 16b protrudes from each of both front and back sides of the outer peripheral surface of the lower fitting portion 37. Accordingly, the holder 30 can be made less likely to be pulled upward from the frame 14.

A slit 37e is formed around the claw 37d except at the lower end thereof so as to penetrate the lower fitting portion 37 in the front-back direction. The claw 37d gradually protrudes outward in the radial direction from the lower end toward the upper end side thereof. Accordingly, it can be made easier to elastically deform the claw 37d inward in the radial direction when the lower fitting portion 37 is inserted into the hole 16a (cylindrical wall 16b) from above, thereby facilitating the insertion of the lower fitting portion 37.

The upper end of the claw 37d is slightly inclined toward the lower end side as extending outward in the radial direction. Accordingly, even if there is an error in the dimension in the up-down direction from the upper surface portion 15 to the lower end of the cylindrical wall 16b for each frame 14, the error can be absorbed by shift of the position where the cylindrical wall 16b comes into contact with the inclination of the upper end of the claw 37d, in the radial direction. Thus, rattling in the up-down direction of the holder 30 relative to the frame 14 can be suppressed.

Next, the mechanism for suppressing rattling between the holder 30 and the stay 22 will be described. As shown in FIG. 2, FIG. 4, and FIG. 5, on the back side of the main body portion 35, two pressing portions 38 are provided between the upper fitting portion 36 and the lower fitting portion 37 at positions away from the upper fitting portion 36 and the lower fitting portion 37. Each pressing portion 38 protrudes inward in the radial direction from the inner peripheral surface of the main body portion 35 and narrows the inner diameter of the main body portion 35. The protruding amount of each pressing portion 38 from the main body portion 35 is about 1 to 2 mm or less.

The pressing portions 38 are pressed against the stay 22, thereby suppressing rattling between the holder 30 and the stay 22. In addition, a frictional force in the up-down direction is generated between each pressing portion 38 and the stay 22 in accordance with a pressing force applied when each pressing portion 38 is pressed against the stay 22. By adjusting the magnitude of this pressing force, the headrest 20 can be inhibited from moving downward under its own weight when the fixation by the locking mechanism 32 is released. Furthermore, the ease with which the headrest 20 can be moved up and down by a seated person or the like at the time of the release can be adjusted by adjusting the pressing force.

Each pressing portion 38 includes a pair of inclined portions 39 inclined inward in the radial direction as extending from both ends in the up-down direction of the pressing portion 38 toward each other, and a contact portion 40 connecting the pair of inclined portions 39 in the up-down direction. Each inclined portion 39 has an inner surface on the axis C side and an outer surface on the side opposite thereto in a cross-section including the axis C, and both of these surfaces are inclined substantially linearly as extending toward the contact portion 40.

The contact portion 40 has an inner surface on the axis C side and an outer surface on the side opposite thereto in a cross-section including the axis C, and both of these surfaces are formed substantially parallel to the axis C. Accordingly, the inner surface of the contact portion 40 comes into surface contact with the outer peripheral surface of the stay 22. As a result, even in the case where each pressing portion 38 is formed from a relatively easily deformable resin such as polypropylene, the pressing force to the stay 22 can be ensured.

When each pressing portion 38 and the stay 22 are in surface contact with each other, each pressing portion 38 supports the stay 22 at three points. The pressing force from each pressing portion 38 to the stay 22 can be stabilized as compared to the case where each pressing portion 38 and the stay 22 are in point contact or line contact with each other. Furthermore, in comparison with point contact or line contact, surface contact allows the pressing force and the frictional force by the pressing portion 38 to be maintained at a less worn portion even if a portion where the pressing portion 38 and the stay 22 are in contact with each other is locally worn. As a result, the durability of the pressing portion 38 can be improved.

Since the pressing portions 38 are located away from the frame 14, radially outward deformation of the pressing portions 38 in contact with the stay 22 is not restricted by the frame 14. However, even without such restriction, since each pressing portion 38 is fixed at both ends thereof in the up-down direction to the main body portion 35 by the pair of inclined portions 39, it is easy to ensure the pressing force to the stay 22 by the pressing portion 38.

The length in the up-down direction of the pressing portion 38 is preferably 0.7 to 1.3 times the outer diameter of the stay 22 (inner diameter of the main body portion 35). In this case, it can be made easy to ensure the rigidity of the pressing portion 38 against the load in the radial direction, and it can be made easier to ensure the pressing force to the stay 22 by the pressing portion 38.

Since the two pressing portions 38 are aligned in the up-down direction, the stay 22 can be inhibited from oscillating with the contact portion between one pressing portion 38 and the stay 22 as a fulcrum. As a result, rattling of the stay 22 relative to the holder 30 can be further suppressed.

A cut portion 42 is formed on one side in the circumferential direction (left side in the present embodiment) of the pressing portions 38, and a slit 43 is formed on the other side in the circumferential direction (right side in the present embodiment) of the pressing portions 38. The cut portion 42 and the slit 43 are portions for separating both sides in the circumferential direction of each pressing portion 38 from the main body portion 35. Accordingly, each pressing portion 38 can be approximated to a beam fixed at both ends thereof, thereby making it easier to adjust the pressing force by the pressing portion 38.

As shown in FIG. 4 to FIG. 6, the cut portion 42 is formed by cutting the main body portion 35 from the one side in the circumferential direction of the pressing portions 38 to positions opposing the pressing portions 38 in the front-back direction, over the circumferential direction. Furthermore, the cut portion 42 is formed so as to be continuous from the upper end of the pressing portion 38 on the upper side to the lower end of the pressing portion 38 on the lower side.

Here, for example, when the holder 30 made of a resin is molded using a mold, since the pressing portions 38 which protrude from the inner peripheral surface of the main body portion 35 are aligned in the up-down direction, if an attempt is made to pull out, in the axis C direction, a part of the mold that molds this inner peripheral surface, the part of the mold is forcibly pulled out. However, by providing the cut portion 42, a part of the mold that molds a portion between the pressing portions 38 aligned in the up-down direction is allowed to be pulled out in the radial direction from the cut portion 42, thereby easily avoiding forcibly pulling out of the mold.

Furthermore, the inner peripheral surface of a portion, of the main body portion 35, opposing each pressing portion 38 in the front-back direction and the inner peripheral surface of each pressing portion 38 extend parallel to the left-right direction on the left side (cut portion 42 side) with respect to the center in the left-right direction in a cross-section perpendicular to the axis C. Meanwhile, the inner peripheral surface of this portion of the main body portion 35 and the inner peripheral surface of each pressing portion 38 are formed in substantially the same arc shape as the inner peripheral surface of the main body portion 35 (outer peripheral surface of the stay 22), on the right side with respect to the center in the left-right direction in the cross-section perpendicular to the axis C. Accordingly, it can be made easier to bring each pressing portion 38 and the main body portion 35 into surface contact with the stay 22 in a wider range on the right side, and it can also be made easier to avoid forcibly pulling out of a part of the mold when pulling out the part of the mold leftward from the cut portion 42.

The slit 43 is formed with a sufficiently small width in the circumferential direction relative to the cut portion 42 so as to be divided vertically, at each pressing portion 38. Accordingly, the two pressing portions 38 aligned in the up-down direction can be maintained in a state where the pressing portions 38 are separated from the main body portion 35 on the left side thereof by the cut portion 42 but are fixed to the main body portion 35 on the right side thereof. That is, even in the case where the cut portion 42 is provided, each pressing portion 38 can be maintained in a state where both upper and lower ends thereof are fixed to the main body portion 35.

For example, when the holder 30 made of a resin is molded using a mold, if an attempt is made to mold a right-side portion of each pressing portion 38 with a part of the mold that is to be pulled out leftward from the cut portion 42, the part of the mold is forcibly pulled out. However, by pulling out the part of the mold that molds this portion backward or rightward from the slit 43, it can be made easier to avoid forcibly pulling out of the part of the mold.

As shown in FIG. 2 and FIG. 6, a projection portion 45 protrudes inward in the radial direction from the inner peripheral surface of the upper end portion 33. In the holder 30, the projection portion 45 is provided at the position where the flange 33a is formed in the upper end portion 33. In the holder 31, the projection portion 45 is provided on the underside of the flange 33a in the upper end portion 33 so as not to interfere with the locking mechanism 32.

Similar to each pressing portion 38, the projection portion 45 protrudes from the upper end portion 33 so as to narrow the inner diameter of the upper end portion 33. The protruding amount of the projection portion 45 is about 1 to 2 mm or less. The projection portion 45 can be pressed against the stay 22, thereby suppressing rattling of the stay 22 at a position close to the headrest 20.

The projection portion 45 is provided on the front side of the upper end portion 33. Meanwhile, each pressing portion 38 is provided on the back side of the main body portion 35. By pressing of these portions against the stay 22, a load can be applied to the stay 22 such that the headrest 20 is tilted backward. As a result, the headrest 20 can be inhibited from rattling so as to be tilted backward when a seated person places their head against the headrest 20.

A pair of such projection portions 45 are arranged symmetrically in the circumferential direction (left-right direction) at positions opposing the pressing portions 38 in the holder 30 when viewed in the axis C direction. Accordingly, both rattling of the stay 22 in the front-back direction, in which each projection portion 45 and each pressing portion 38 oppose each other, and rattling of the stay 22 in the left-right direction orthogonal to the front-back direction can be suppressed.

While the present invention has been described above based on the above embodiment, the present invention is not limited to the above embodiment at all. It can be easily understood that various modifications can be made without departing from the spirit of the present invention.

For example, the numbers, the arrangement, the dimensions, etc., of the pressing portions 38, the linear ribs 33c, the reinforcement ribs 33d, the upper narrow projection portions 36d, the upper thick projection portion 36e, the lower narrow projection portions 37a, the lower thick projection portion 37b, and the projection portions 45 may be changed as appropriate. In addition, a plurality of pairs of projection portions 45 may be provided.

The holders 30 and 31 may be formed from a synthetic resin other than polypropylene, a metal, or the like. The frame 14, the stays 22 and 23, etc., are not limited to be made of a metal, and may be made of a synthetic resin.

In the above embodiment, the case where the holders 30 and 31 are directly attached to the frame 14 has been described, but the present invention is not limited thereto. The holders 30 and 31 may be inserted into tubular brackets attached to the frame 14. In this case, it is preferable that the pressing portions 38 which are pressed against the stays 22 and 23 and deformed outward in the radial direction are configured such that the pressing portions 38 do not come into contact with the brackets. Accordingly, the pressing force by each pressing portion 38 can be prevented from fluctuating due to contact with the bracket.

In the above embodiment, the case where all the pressing portions 38 are provided in the main body portion 35 between the upper fitting portion 36 and the lower fitting portion 37 has been described, but the present invention is not limited thereto. At least one pressing portion 38 may be provided in the main body portion 35 below the lower fitting portion 37. At least one pressing portion 38 may be provided in the upper end portion 33 above the upper fitting portion 36. The upper end portion 33 which is exposed upward from the frame 14 receives a load transmitted from the headrest 20 to the frame 14, and thus the required strength of the upper end portion 33 is higher than that of the main body portion 35. Therefore, when no pressing portion 38 is provided in the upper end portion 33, it can be made easier to increase the strength of the upper end portion 33 and the strength of the upper end portion 33 can be designed more easily.

In the above embodiment, the case where the pressing portions 38 are provided on the back side of the main body portion 35 has been described, but the present invention is not limited thereto. The pressing portions 38 may be provided on any of the front, back, left, and right sides of the main body portion 35. For example, the pressing portions 38 may be provided at a plurality of locations in the circumferential direction, such as on the back side and the left side of the main body portion 35.

It is preferable that the projection portions 45 are placed at the positions opposing the pressing portions 38 when viewed in the axis C direction, but the projection portions 45 may be provided at positions other than the positions opposing the pressing portions 38. For example, each pressing portion 38 and each projection portion 45 may be arranged so as to be aligned in the up-down direction.

In the above embodiment, the case where the contact portions 40 of the pressing portions 38 come into surface contact with the stays 22 and 23 has been described, but the present invention is not limited thereto. The shapes of the pressing portions 38 may be changed as appropriate such that the pressing portions 38 come into point contact or line contact with the stays 22 and 23. Alternatively, the shapes of the pressing portions 38 may be changed as appropriate such that a plurality of portions of each pressing portion 38 come into contact with the stay 22 or 23.

In the above embodiment, the case where each pressing portion 38 is separated from the main body portion 35 on both sides thereof in the circumferential direction by the cut portion 42 and the slit 43 has been described, but the present invention is not limited thereto. At least one of the cut portion 42 and the slit 43 may be omitted, and one side or both sides in the circumferential direction of the pressing portion 38 may be fixed to the main body portion 35. Alternatively, the cut portion 42 may be omitted, and the slit 43 may be provided on each of both sides in the circumferential direction of the pressing portion 38. Still alternatively, the cut portion 42 may be provided on the right side of the pressing portion 38, and the slit 43 may be provided on the left side of the pressing portion 38.

In the above embodiment, the case where the orientation of the holders 30 and 31 with respect to the frame 14 is specified by the recesses 15*c*, 15*d*, and 15*e* provided in the frame 14 and the protrusions 36*a*, 36*b*, and 36*c* provided in the holders 30 and 31, has been described, but the present invention is not limited thereto. For example, the holes 15*a* and 16*a* of the frame 14 and the upper fitting portions 36 and the lower fitting portions 37 of the holders 30 and 31 which are fitted thereinto may have polygonal shapes when viewed in the axis C direction.

DESCRIPTION OF REFERENCE NUMERALS

10 passenger seat
12 back frame
14 upper frame
15 upper surface portion
16 lower surface portion
15*a*, 16*a* hole
20 headrest
22, 23 stay
30, 31 headrest holder
33 upper end portion (part of a tube body)
35 main body portion (part of a tube body)
36 upper fitting portion
36*d* upper narrow projection portion
36*e* upper thick projection portion
37 lower fitting portion
37*a* lower narrow projection portion
37*b* lower thick projection portion
38 pressing portion
39 inclined portion
40 contact portion
42 cut portion
45 projection portion

The invention claimed is:

1. A headrest holder to be attached to an upper frame of a back frame of a passenger seat, the headrest holder comprising:
   a tube body into which a stay of a headrest capable of supporting a head of a seated person from back is inserted from an upper end thereof; and
   a plurality of pressing portions protruding inward in a radial direction from an inner peripheral surface of the tube body so as to be pressed against the stay, and formed so as to be aligned in an up-down direction, wherein
   each of the pressing portions is fixed at both ends thereof in the up-down direction to the tube body; wherein the tube body includes:
   a tubular upper end portion forming an upper end side of the tube body, and
   a tubular main body portion extending downward from the upper end portion,
   a projection portion protrudes inward in the radial direction from a front side of an inner peripheral surface of the upper end portion, and
   the pressing portions protrude inward in the radial direction from a back side of an inner peripheral surface of the main body portion; wherein
   the headrest holder has a locking mechanism for fixing a vertical position of the stay by engaging a groove provided on an outer peripheral surface of the stay, or does not have the locking mechanism, and
   the projection portion is provided separately from the locking mechanism when the headrest holder has the locking mechanism.

2. The headrest holder according to claim 1, wherein each of the pressing portions includes
   a pair of inclined portions inclined inward in the radial direction as extending from both ends in the up-down direction toward each other, and
   a contact portion connecting the pair of inclined portions in the up-down direction and capable of coming into surface contact with the stay.

3. The headrest holder according to claim 1, further comprising a second projection portion protruding inward in the radial direction from the inner peripheral surface of the tube body, making a pair of projection portions,
   wherein the pair of projection portions are arranged symmetrically in a circumferential direction at positions opposing the pressing portions when viewed in an axis direction of the tube body.

4. The headrest holder according to claim 1, wherein a cut portion is formed on one side in a circumferential direction of the plurality of pressing portions in the tube body from the one side to positions opposing the pressing portion, over the circumferential direction, so as to be continuous in the up-down direction.

5. The headrest holder according to claim 1, wherein
the headrest holder is a headrest holder to be attached to the upper frame including an upper surface portion and a lower surface portion spaced apart from each other in the up-down direction,
the headrest holder comprises
an upper fitting portion to be fitted into a hole provided in the upper surface portion, and
a lower fitting portion to be fitted into a hole provided in the lower surface portion, and
the pressing portions are formed at positions away from the upper fitting portion and the lower fitting portion in the up-down direction.

6. The headrest holder according to claim 5, further comprising:
an upper narrow projection portion protruding from the front side of an outer peripheral surface of the upper fitting portion;
an upper thick projection portion protruding from the back side of the outer peripheral surface of the upper fitting portion and having a larger width in a circumferential direction than the upper narrow projection portion;
a lower narrow projection portion protruding from the back side of an outer peripheral surface of the lower fitting portion; and
a lower thick projection portion protruding from the front side of the outer peripheral surface of the lower fitting portion and having a larger width in the circumferential direction than the lower narrow projection portion.

7. A headrest holder fixing structure comprising the headrest holder according to claim 5 and an upper frame to which the headrest holder is attached, wherein
the upper frame includes
an upper surface portion having a hole into which the upper fitting portion is fitted, and
a lower surface portion placed below the upper surface portion so as to be spaced apart from the upper surface portion and having a hole into which the lower fitting portion is fitted, and
the pressing portions are located away from the upper frame.

8. A headrest holder to be attached to an upper frame of a back frame of a passenger seat, the headrest holder comprising:
a tube body into which a stay of a headrest capable of supporting a head of a seated person from back is inserted from an upper end thereof; and a plurality of pressing portions protruding inward in a radial direction from an inner peripheral surface of the tube body so as to be pressed against the stay, and formed so as to be aligned in an up-down direction, wherein each of the pressing portions is fixed at both ends thereof in the up-down direction to the tube body;
further comprising a pair of projection portions protruding inward in the radial direction from the inner peripheral surface of the tube body,
wherein the pair of projection portions are arranged symmetrically in a circumferential direction at positions opposing the pressing portions when viewed in an axis direction of the tube body.

* * * * *